(12) United States Patent  
Takahashi

(10) Patent No.: US 6,283,615 B1  
(45) Date of Patent: Sep. 4, 2001

(54) ILLUMINATION APPARATUS

(75) Inventor: Ryusaku Takahashi, Kanagawa-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 0 days.

(21) Appl. No.: 09/545,879

(22) Filed: Apr. 7, 2000

(30) Foreign Application Priority Data

Apr. 13, 1999 (JP) .................................. 11-105757

(51) Int. Cl.$^7$ ........................................................ F21V 5/00
(52) U.S. Cl. ........................... 362/328; 362/333; 362/336
(58) Field of Search ............................. 362/311, 328, 362/333, 334, 335, 336, 338, 309; 359/708, 721, 626, 725, 728

(56) References Cited

U.S. PATENT DOCUMENTS

| | | | | |
|---|---|---|---|---|
| 1,393,573 | * | 10/1921 | Ritter | 359/728 |
| 2,143,435 | * | 1/1939 | Dietrich | 362/338 |
| 2,215,900 | * | 9/1940 | Bitner | 362/333 |
| 2,853,599 | * | 9/1958 | Kliegl | 362/333 |

FOREIGN PATENT DOCUMENTS 07174974   7/1995  (JP) .

* cited by examiner

Primary Examiner—Y. Quach  
(74) Attorney, Agent, or Firm—Nath & Associates PLLC; Gary M. Nath

(57) ABSTRACT

An Illumination apparatus according to the present invention is provided with a light source, a mirror that reflects a light emitted by the light source and converts it to a convergent light beam, and a collimator lens that collimates the convergent light beam reflected by the mirror to a collimated light beam. Here, the collimator lens is provided with a region positioned at a central region with respect to an optical axis and having a negative focal distance, and a plurality of concentric annular regions centering with respect to the optical axis and having focal distances different from each other.

3 Claims, 4 Drawing Sheets

ILLUMINATION APPARATUS

BACKGROUND OF THE INVENTION

The present invention relates to an illumination apparatus having a collimator lens, and more particularly to an illumination apparatus having a collimator lens that converts a convergent light beam to a collimated light beam.

In the past, a projection display apparatus was known such that a light emitted by an illumination apparatus illuminates a spatial light modulator and the light modulated by the spatial light modulator is projected onto a screen so as to display a picture image thereon.

Upon investigation by the inventor of the present invention, a configuration described below is presented.

As shown in FIG. 1, a light emitted from a light source 39 between a pair of opposing electrodes 37 of a light bulb 21 is reflected by a mirror 23, after which it is converted to a collimated light beam by a collimator lens 25, and enters into an integrator 31 having a first fly-eye lens 27 and a second fly-eye lens 29.

The fly-eye lenses 27 and 29 of the integrator 31, as observed from the direction of the optical axis O shown in FIG. 1, have tiny lens segments 27e and 29e, respectively, arranged in a matrix. The integrator 31 is configured so that each spot image of the light bulb 21 by the lens segments 27e of the first fly-eye lens 27 is correspondingly formed at the lens segments 29e of the second fly-eye lens 29. When viewed from the left side in the direction of the optical axis O in FIG. 1, each spot image 32 of the light bulb 21 formed at the lens segments 29e of the second fly-eye lens 29 appears as shown in FIG. 2.

Returning to FIG. 1, the light exiting from the second fly-eye lens 29 passes through a condenser lens 33, and then enters into a spatial light modulator 35.

The spatial light modulator 35 is an element that, by use of the birefringence of a liquid crystal, for example, imparts light modulation to its incident light in accordance with a video signal. In this case, the light from the light-collecting lens 33 is reflected by the spatial light modulator 35 as it is modulated thereby, so that the reflected light forms a video image on a screen (not shown in the drawing).

As shown in FIG. 1, the above-noted collimator lens 25 in general has simple spherical curved surfaces at its light entrance and exit surfaces.

SUMMARY OF THE INVENTION

However, upon further making more detailed investigation of the above-presented illumination apparatus, the inventor has found out the following technical facts.

Firstly, as shown in FIG. 3, together with the above-described collimator lens 25, while a light beam exiting therefrom and propagating in a region A near the optical axis O is converted into a collimated light beam with relatively good precision, each light exiting from the collimator lens 25 and propagating in regions B and C that are distant from the optical axis C exhibits a tendency to gradually broaden outward as it propagates from the collimator lens 25 along the direction of the optical axis C.

In order to compensate for such broadening of the light beam, an attempt was made to appropriately shift the optical axes of the lens segments 27e of the first fly-eye lens 27 shown in FIG. 1 in a direction perpendicular thereto, for example. However, when the optical axes of the lens segments 27e are shifted in this way, steps occurs between adjacent lens segments 27e, and these steps cause so-called sags at the edge parts of the first fly-eye lens 27 when the lens 27 is manufactured. Additionally, the trueness to sphericity of the lens segments 27e is lowered, and non-uniformity occurs in the radius of curvature of the lens segments 27e. When the collimator lens 25 is used in the illumination apparatus, these phenomena cause mass production problems such as a worsening of yield and, because sag cannot be completely eliminated, there is even a lowering of the illumination efficient itself.

Accordingly, in accordance with the above-described investigation, it is an object of the present invention to provide an illumination apparatus which is suitable for mass production and which features a high illumination efficiency, using a collimator lens that performs precise conversion of a light beam entering thereinto in order to generate a collimated light beam, even at locations distant from the optical axis, that is, regardless of the distance from the optical axis.

An Illumination apparatus according to the present invention is provided with a light source, a mirror that reflects a light emitted by the light source and converts it to a convergent light beam, and a collimator lens that collimates the convergent light beam reflected by the mirror to a collimated light beam. Here, the collimator lens is provided with a region positioned at a central region with respect to an optical axis and having a negative focal distance, and a plurality of concentric annular regions centering with respect to the optical axis and having focal distances different from each other.

DESCRIPTION OF THE PREFERRED EMBODIMENT

An embodiment of the present invention is described in detail below, with reference made to a relevant accompanying drawing.

Figure 4:
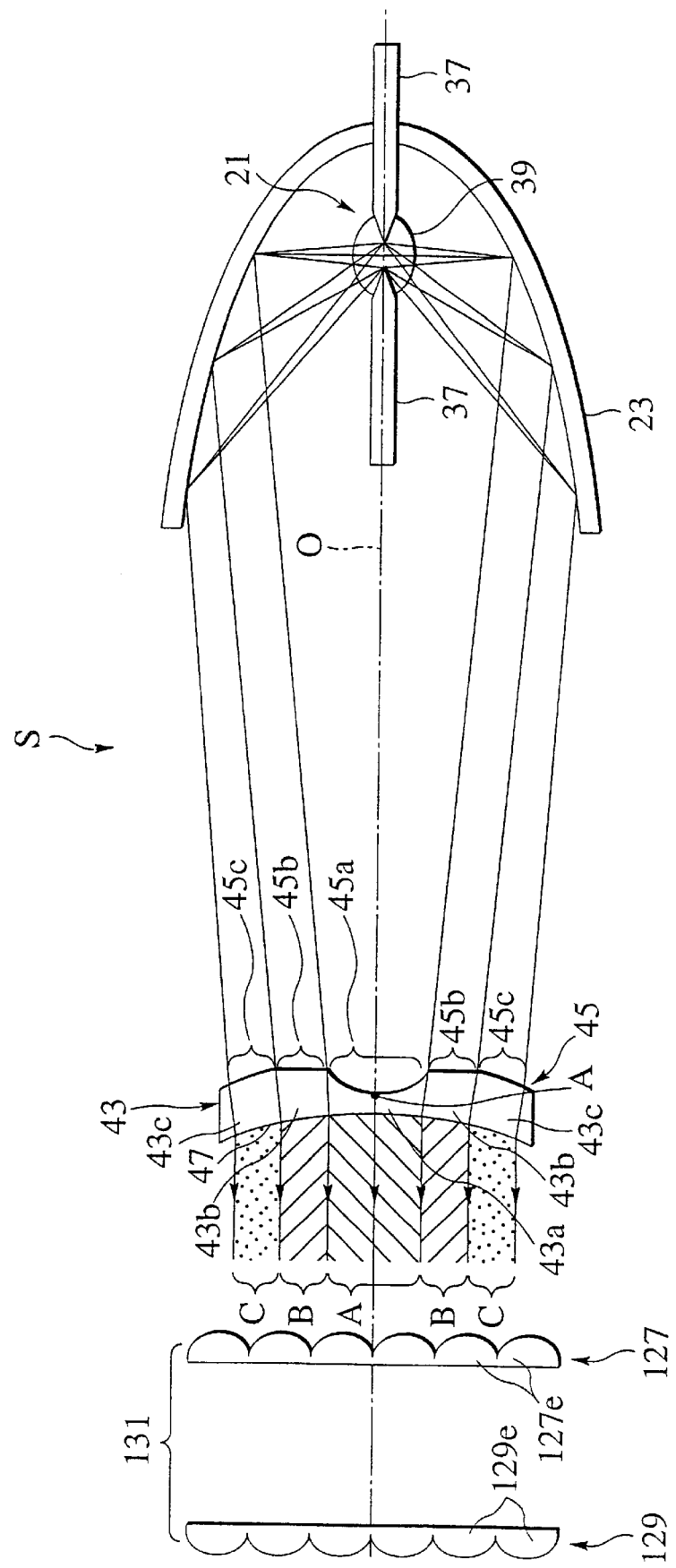
FIG. 4 is a drawing illustrating an illumination apparatus according to an embodiment of the present invention.

FIG. 4 shows the configuration of an illumination apparatus according to an embodiment of the present invention.

As shown in FIG. 4, an illumination apparatus S according to an embodiment of the present invention has a light bulb 21 having a pair of opposing electrodes 37 disposed on the optical axis O so as to generate a light source 39 and emit a light therefrom, a mirror 23 disposed with its central axis on the optical axis O and having an elliptical reflecting surface symmetrical with respect to the optical axis O so as to reflect the light emitted from the light bulb 21 and entered thereinto as a convergent light beam, and a collimator lens 43 made of transparent glass material and disposed with its central axis coinciding with the optical axis O. Into the collimator lens 43, the convergent light beam reflected from the mirror 23 is entered.

The above-noted collimator lens 43 has a light entrance surface 45 and a light exit surface 47, and is provided with a central region 43a and a plurality of concentric annular ring regions 43b and 43c each of which has its central axis centering with the optical axis O. The central region 43a and plurality of concentric annular ring regions 43b and 43c are disposed successively in a direction moving toward the outside from the optical axis O.

As to the annular regions 43a, 43b, and 43c, the light entrance surface 45 is respectively divided into sectional light entrance surfaces 45a, 45b, and 45c having mutually different focal distances.

More specifically, the light entrance surface 45a of the central region 43a has a concave spherical surface. That is, the center of curvature of the light entrance surface 45a in FIG. 4 is at the right side (side of the object) of the collimator lens 43 on the optical axis O, and the surface is a concave spherical surface as seen from the direction of travel of the light. The light entrance surface 45b of the intermediate region 43b is extends in a direction perpendicular to the optical axis O, and has a curvature of zero. The light entrance surface 45c of the outer region 43c has a convex spherical surface. That is, the center of curvature of the light entrance surface 45c in FIG. 4 is on the left side of the collimator lens 43 (image side), and the surface is a convex spherical surface as seen from the direction of travel of the light. More specifically, the light entrance surface 45c has a radius of curvature that is equal to that of the light exit surface 47 to be described below, and is established so as to be a curved surface parallel to the light exit surface 47.

The light exit surface 47 of the collimator lens 43 is a concave spherical surface having a single radius of curvature. That is, the center of curvature of the light exit surface 47 in FIG. 4 is on the left side (image side) of the collimator lens 43, and the surface is a concave spherical surface as seen from the direction of travel of the light. Due to a collimating state to be required, of course, there is a case in which it is possible to have such a light exit surface 47 that has a curvature of zero, that is, a surface that is flat.

Figure 1:
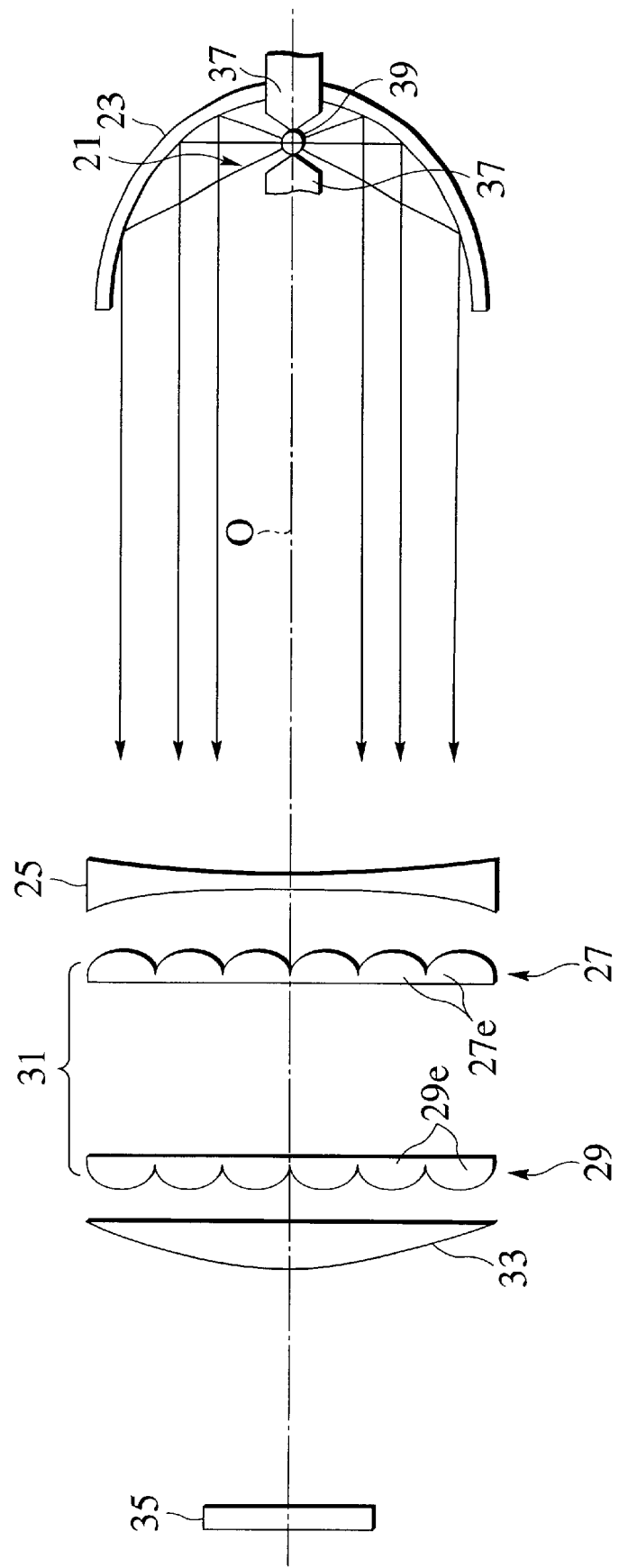
FIG. 1 shows a schematic configuration of an illumination apparatus using a collimator lens as investigated by the inventor of the present invention.
Figure 2:
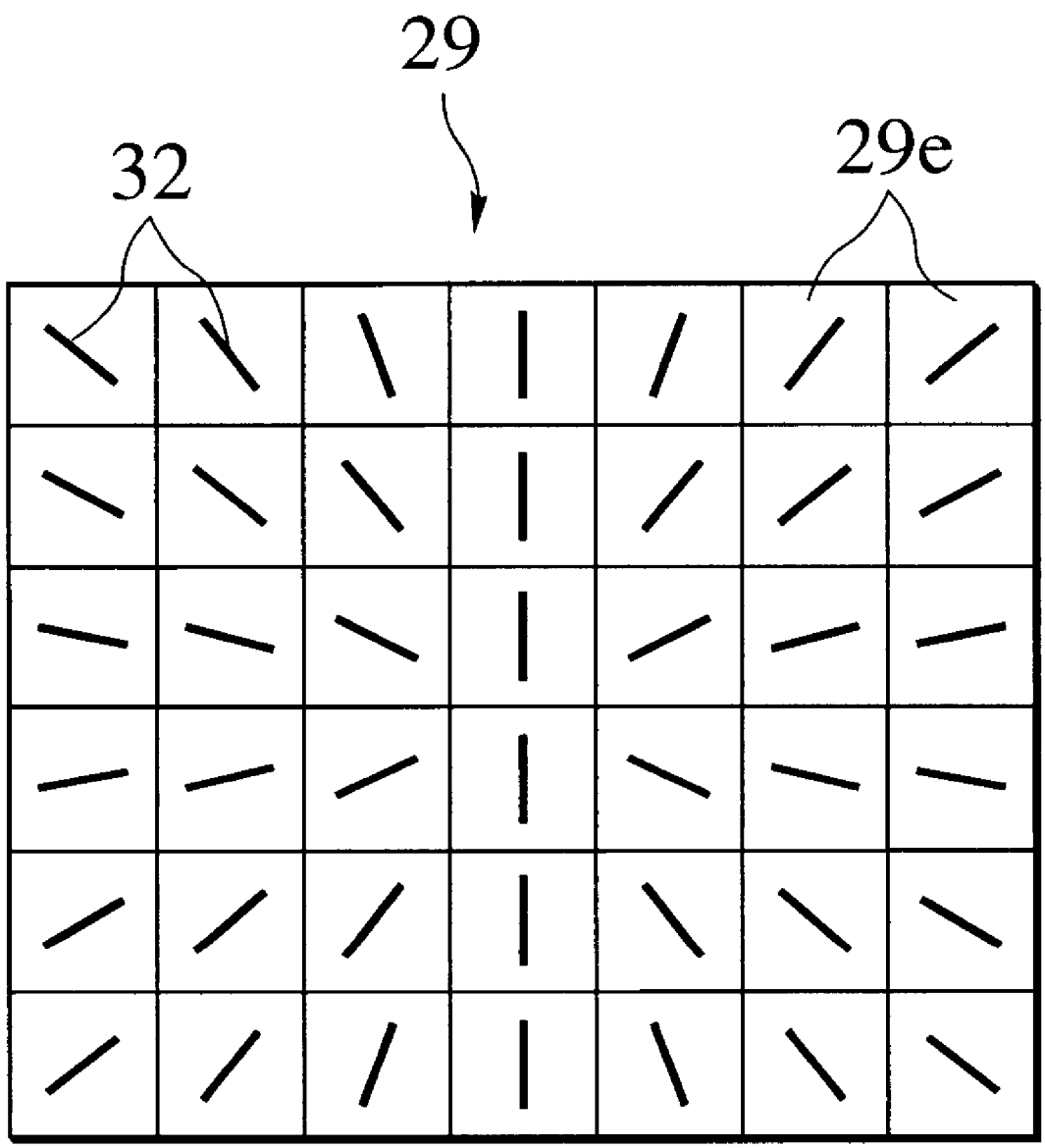
FIG. 2 is a drawing illustrating the action of the first and second fly-eye lenses provided in the illumination apparatus shown in FIG. 1.
Figure 3:
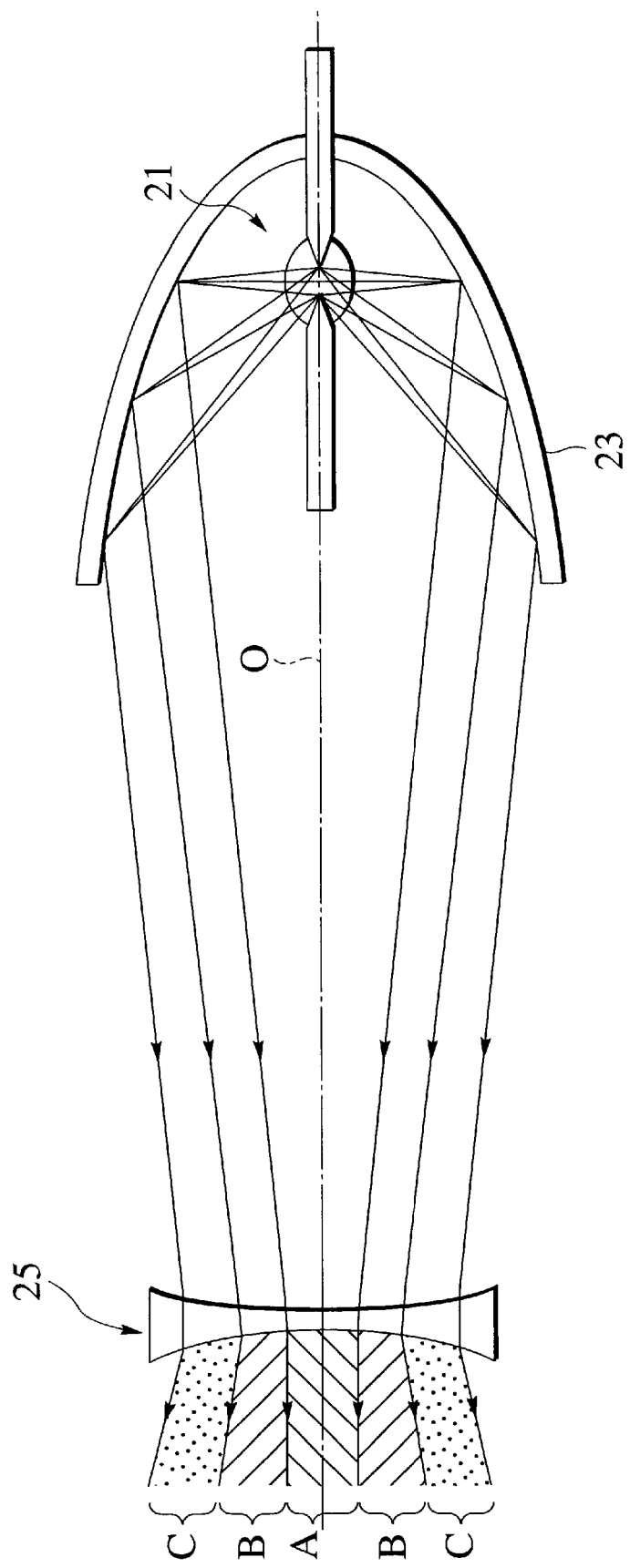
FIG. 3 is a drawing illustrating the action of the collimator lens as investigated by the inventor of the present invention.

This embodiment of the present invention assumes that an integrator 131 is used as the subsequent element after the illumination apparatus S. The integrator 131 is similar to the integrator that was the subject of the investigation illustrated in FIG. 1 and FIG. 2. That is, as to the first and second fly-eye lenses 127 and 129, as seen in the direction of the optical axis O in FIG. 4, there are tiny lens segments 127e and 129e disposed thereon in a matrix arrangement. The integrator 131 is configured so that each spot image of the light bulb 21 formed by the lens segments 127e of the first fly-eye lens 127 is positioned at the lens segments 129e forming the second fly-eye lens 129, correspondingly.

In this arrangement, to be more specific with regard to the relationship between the shape of the light entrance surface 45a of the central region 43a of the collimator lens 43 and the shape of the light exit surface 47, the relationship between the shape of the light entrance surface 45b of the intermediate region 43b and the shape of the light exit surface 47, and the relationship between the shape of the light entrance surface 45c of the outer region 43c and the shape of the light exit surface 47, because the light entrance surface 45b is flat, each value of radii of curvatures of the light entrance surfaces 45a and 45c and the light exit surface 47 is established so that each spot image of the light bulb 21 formed on the second fly-eye lens 129 passes through the center of each lens segment 129e.

Accordingly, in this embodiment, by dividing the collimator lens into the plurality of regions, and also by using the appropriate combination of the concave, flat, and convex refracting surfaces, it is possible to effectively suppress the tendency of the emerging light beam to broaden with increasing the distance from the optical axis, thereby obtaining the emerging light beam parallel to the optical axis in substantially all regions of the collimator lens. By doing this, it is not necessary to augment insufficient collimating capability by utilizing the subsequent optical element such as an integrator, and it is possible to achieve an illumination apparatus that is not only suitable for mass production, but also one that achieves a good illumination efficiency.

While, in the embodiment, the entrance surface of the collimator lens is divided into the three annular and circular regions that are concentric about the optical axis as their central axes, it will be understood that there is essentially no limitation on the number of regions. That is, it is possible if necessary to divide the light entrance surface into either two or four concentric annular and circular regions. In either case also, depending upon desired collimating function, a preferable combination selected from concave, flat, and convex surfaces can be used.

Additionally, rather than the light entrance surface of the collimator lens, it is alternately possible to divide the light exit surface into a preferable combination of concave, flat, and convex surfaces corresponding to a plurality of concentric annular and circular regions, and further to divide both the light entrance surface and the light exit surface into such surfaces in the same manner.

If necessary, the concave and convex surfaces of the concentric annular and circular regions can be non-spherical rather than the above-described simple spherical surfaces.

While the collimator lens in the embodiment is made of glass material, depending upon the type of a light to be used or the like, it is possible to use another material such as resin or the like having an appropriate transparency.

While the light source in the embodiment is provided with a pair of electrodes to emit the light, as long as it is possible to generate a light of the required characteristics, it is alternately possible to use an incandescent light source or other type of a light source.

There is essentially no restriction as to the shape of the mirror to use the elliptical surface, and it is possible to alternately use a mirror having a spherical surface, a parabolic surface, or other type of a complex non-spherical surface, as long as the mirror is capable of reflecting the light emitted by the light source as the convergent light.

It is also possible to impart the spherical surface shape or the like of the concentric annular regions of the light entrance surface or the like of the collimator lens to the mirror, so as to equivalently augment the collimating function of the optical system of the illumination apparatus.

While, in the embodiment, the subsequent part of the optical element is the integrator having the fly-eye lens, it will be understood that this is not an essential structure, and that it is alternately possible to apply another type of element requiring a collimated light.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. An illumination apparatus comprising:

a light source;

a mirror reflecting a light emitted by the light source and converting the light to a convergent light beam; and a collimator lens converting the convergent light beam exited from the mirror to a collimated light beam, wherein the collimator lens is provided with a region positioned at a central region with respect to an optical axis and having a negative focal distance, and a plurality of concentric annular regions centering with respect to the optical axis and having focal distances different from each other.

2. An illumination apparatus according to claim 1, wherein the focal distances of the plurality of concentric annular regions have negative lens power that are weaker as the plurality of concentric annular regions are more distant from the optical axis.

3. An illumination apparatus according to claim 2, wherein the focal distances of the plurality of concentric annular regions have lens power changing from a negative value to a positive value as the plurality of concentric annular regions are more distant from the optical axis.

* * * * *